United States Patent Office 3,076,811
Patented Feb. 5, 1963

3,076,811
**NOVEL 12H-INDOLO[2,3-b]INDAZOLO[5,4-h]
QUINOLIZINE COMPOUNDS**
Merrill Frederick Bartlett, Warren Township, N.J., assignor to Ciba Corporation, a corporation of Delaware
No Drawing. Filed Oct. 13, 1960, Ser. No. 62,326
5 Claims. (Cl. 260—288)

The present invention concerns quinolizine compounds, particularly 5,6,8,8a,9,10,13b - 14,14a,15-decahydro-12H-indolo[2,3-b]indazolo[5,4-h]quinolizine compounds having the ring system of the formula

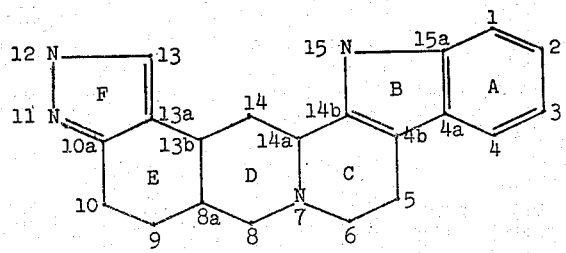

or the corresponding 11,13-dihydro or 13,13a-dihydro derivatives thereof, which compounds may contain substituents attached to the positions available for substitution in the hexacyclic carbocyclic aryl ring A, in the hexacyclic heterocyclic pyrido ring C, in the hexacyclic carbocyclic ring E and in the pentacyclic heterocyclic pyrazolo ring F, as well as substituents attached to the nitrogen atom of the pentacyclic heterocyclic pyrrolo ring B, salts, N-oxides or salts of N-oxides thereof, as well as process for the preparation of these compounds. More especially the invention relates to compounds of the formula

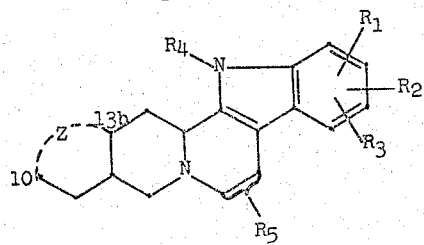

in which each of the groups $R_1$, $R_2$ and $R_3$ stands for hydrogen, an aliphatic radical, etherified hydroxyl, esterified hydroxyl, etherified mercapto, nitro, amino, halogeno, trifluoromethyl and the like, $R_4$ represents hydrogen, an aliphatic radical or a carbocyclic aryl-aliphatic radical, $R_5$ stands for hydrogen or an aliphatic radical, and Z represents one of the divalent pyrazolo portions of the formulae

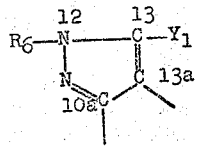

and

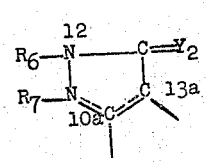

in which each of the radicals $R_6$ and $R_7$ represents hydrogen, an aliphatic radical, a carbocyclic aryl radical, a carbocyclic aryl-aliphatic radical, a heterocyclic aryl radical, a heterocyclic aryl-aliphatic radical and the like, $Y_1$ stands for hydroxyl, etherified hydroxyl, amine and the like, and $Y_2$ represents oxo or imino salts, N-oxides or salts of N-oxides thereof. The hydrogen atoms attached to the 8a-, 13b- and the 14a-position may have either the α- or the β-configuration; for example, rings D and E may have the cis- or the trans-configuration. Furthermore, the new compounds may be present as racemic mixtures, as pure racemates or as the optically active d- or l-form.

Substituents attached to any of the positions available for substitution in the hexacyclic carbocyclic ring A, particularly those represented by the groups $R_1$, $R_2$ and $R_3$ (each of which may also stand for hydrogen) in the previously-given formula, may be, for example, lower aliphatic radicals, especially lower alkyl, containing preferably from one to four carbon atoms, e.g. methyl, ethyl, n-propyl, isopropyl, n-butyl, tertiary butyl and the like, or functional groups, such as, for example, etherified hydroxyl, particularly lower alkoxy, containing preferably from one to four carbon atoms, e.g. methoxy, ethoxy, n-propyloxy, isopropyloxy, n-butyloxy, isobutyloxy and the like, as well as lower alkenyloxy, in which alkenyl contains from two to six, particularly from three to five, carbon atoms, e.g. allyloxy and the like, cycloalkyloxy, in which cycloalkyl contains from three to eight, preferably from five to six, ring carbon atoms, e.g. cyclopentyloxy, cyclohexyloxy and the like, cycloalkyl-lower alkoxy, in which cycloalkyl contains from three to eight, preferably from five to six, ring carbon atoms, e.g. cyclopentylmethoxy, 2-cyclopentylethoxy, cyclohexylmethoxy and the like, carbocyclic aryloxy, such as monocyclic carbocyclic aryloxy, e.g. phenyloxy and the like, carbocyclic aryl-lower alkoxy, such as monocyclic carbocyclic aryl-lower alkoxy, for example, phenyl-lower alkoxy, e.g. benzyloxy, diphenylmethoxy, 2-phenylethoxy and the like, or any other analogous etherfied hydroxyl group, esterified hydroxyl, particularly lower alkoxycarbonyloxy, e.g. methoxycarbonyloxy, ethoxycarbonyloxy and the like, lower alkanoyloxy, e.g. acetoxy, propionyloxy and the like, or any other analogous esterified hydroxyl group, etherified mercapto, particularly lower alkyl-mercapto, containing preferably from one to four carbon atoms, e.g. methylmercapto, ethylmercapto and the like, nitro, amino, particularly N,N-disubstituted amino, such as N,N-di-lower alkyl-amino, e.g. N,N-dimethylamino, N-ethyl-N-methyl-amino, N,N-diethylamino and the like, halogeno, e.g. fluoro- chloro, bromo, iodo and the like, halogeno-lower alkyl, especially trifluoromethyl and the like, or any other suitable functional group. A substituent may also be attached to two adjacent positions of the hexacyclic carbocyclic aryl ring A and form an additional, fused-on ring; for example, two radicals, such as $R_1$ and $R_2$ in the formula, when substituting two neighboring positions and taken together, may form a fused-on cyclic substituent. Such substituents may be represented, for example, by lower alkylene-dioxy, e.g. methylenedioxy, 1,1-ethylenedioxy and the like, or any other analogous grouping.

The nitrogen atom of the pentacyclic, heterocyclic pyrrolo ring B is preferably unsubstituted; it may also carry an aliphatic radical, such as lower alkyl, lower alkenyl and the like, or a carbocyclic aryl-aliphatic radical, such as monocyclic carbocyclic aryl-lower alkyl and the like. $R_4$ in the above formula, therefore, represents particularly hydrogen, as well as lower alkyl containing from one to four carbon atoms, e.g. methyl, ethyl, n-propyl, isopropyl, n-butyl and the like, lower alkenyl containing from two to six, particularly from three to five, carbon atoms, e.g. allyl, 2-methyl-allyl and the like, or phenyl-lower alkyl, in which lower alkyl contains from one to four carbon atoms, e.g. benzyl, diphenylmethyl, 1-phenylethyl, 2-phenylethyl and the like.

Substituents, which may be attached to positions in the hexacyclic heterocyclic pyrido ring C, which are available for substitution, are primarily aliphatic hydrocarbon, such as lower alkyl, containing preferably from one to four carbon atoms, particularly methyl, as well as ethyl, n-propyl, isopropyl and the like. The radical $R_5$ in the previously-given formula, which stands for hydrogen, may, therefore, also represent lower alkyl, particularly methyl, as well as ethyl, n-propyl and the like.

The positions available for substitution in the pentacyclic heterocyclic pyrazolo ring F may be unsubstituted. The nitrogen atoms of the pyrazolo ring, i.e. positions 11 and 12, may contain as substituents, represented, for example, by $R_6$ and $R_7$ in the above formula, aliphatic radicals, particularly lower alkyl containing from one to seven, especially from one to four, carbon atoms, e.g. methyl, ethyl, n-propyl, isopropyl, n-butyl, tertiary butyl, n-pentyl, isopentyl, n-hexyl, n-heptyl and the like, lower alkenyl, containing from two to seven, particularly from three to five, carbon atoms, e.g. allyl, 2-methyl-allyl and the like, or any other aliphatic radical, such as, for example, cycloalkyl, containing from three to eight, particularly from five to six, carbon atoms as ring members, e.g. cyclopentyl or cyclohexyl, as well as cyclopropyl, cycloheptyl, cyclo-octyl and the like, cycloalkyl-lower alkyl, in which cycloalkyl contains from three to eight, especially from five to six, carbon atoms as ring members, and lower alkyl contains from one to four carbon atoms, e.g cyclopropylmethyl, cyclopentylmethyl, 1-cyclopentylethyl, 3-cyclopentylpropyl, cyclohexylmethyl, 2-cyclohexylethyl, cycloheptylmethyl and the like, or any other analogous aliphatic radicals. The latter may also contain substituents; cycloaliphatic, particularly cycloalkyl, portions may be substituted by other aliphatic radicals, such as lower alkyl containing from one to four carbon atoms, e.g. methyl, ethyl and the like. Other groups attached to aliphatic radicals substituting the nitrogen atoms of the pyrazolo portion may be functional groups, such as hydroxyl, etherified hydroxyl, for example, lower alkoxy, e.g. methoxy, ethoxy, n-propyloxy, isopropyloxy and the like, lower alkenyloxy, e.g. allyloxy and the like, cycloalkoxy, e.g. cyclopentyloxy, cyclohexyloxy and the like, carbocyclic aryloxy, e.g. phenyloxy and the like, carbocyclic aryl-lower alkoxy, such as phenyl-lower alkoxy, e.g. benzyloxy, diphenyl-methoxy and the like, or any other etherified hydroxyl group, esterified hydroxyl, for example, lower alkanoyloxy, e.g. acetoxy, propionyloxy and the like, lower alkoxy-carbonyloxy, e.g. methoxy-carbonyloxy, ethoxy-carbonyloxy and the like, halogeno, e.g. fluoro, chloro, bromo and the like, or any other esterified hydroxyl group, mercapto, etherified mercapto, for example, lower alkyl-mercapto, e.g. methylmercapto, ethylmercapto and the like, amino, particularly tertiary amino, for example, N,N-di-substituted amino, such as N,N-di-lower alkyl amino, e.g. N,N-dimethylamino, N,N-diethylamino and the like, N-cycloalkyl-N-lower alkyl-amino, e.g. N-cyclopentyl-N-methyl-amino, N-cyclohexyl-N-ethyl-amino and the like, N-lower alkyl-N-phenyl-lower alkyl-amino, e.g. N-benzyl-N-methyl-amino, N-methyl-N-(2-phenylethyl)-amino and the like, 1-N,N-alkylene-imino, in which alkylene contains from four to seven carbon atoms, e.g. 1-pyrrolidino, 1-piperidino, 1-N,N-hexamethylene-imino and the like, 1-N,N-oxa-alkylene-imino, in which alkylene contains particularly four carbon atoms, e.g. N-morpholino and the like, 1-N,N-thia-alkylene-imino, in which alkylene contains primarily four carbon atoms, e.g. N-thiamorpholino and the like, 1-N,N-aza-alkylene-imino, in which alkylene contains from four to six carbon atoms, especially 4-lower alkyl-1-piperazino, e.g. 4-methyl-1-piperazino and the like, as well as 1-N,N-(4-aza-4-methyl-hexamethylene)-imino and the like, or any other suitable functional group capable of substituting an aliphatic radical.

Other substituents which may be attached to the nitrogen atoms of the pyrazolo ring, and which may, therefore, be represented by the groups $R_6$ and $R_7$ in the above formula, are carbocyclic aryl groups, especially monocyclic or bicyclic carbocyclic aryl groups, e.g. phenyl, 1-naphthyl, 2-naphthyl or these groups substituted in one or more than one of the available positions by the same or by different substituents, such as lower alkyl containing from one to four carbon atoms, e.g. methyl, ethyl, isopropyl, tertiary butyl and the like, lower alkoxy containing from one to four carbon atoms, e.g. methoxy, ethoxy, isobutyloxy and the like, lower alkylene-dioxy, in which alkylene contains from one to four carbon atoms, e.g. methylenedioxy, 1,1-ethylenedioxy and the like, lower alkyl-mercapto containing from one to four carbon atoms, e.g. methylmercapto, isopropylmercapto, n-butylmercapto and the like, nitro, amino, particularly N,N-di-lower alkyl-amino, in which lower alkyl contains from one to four carbon atoms, e.g. N,N-dimethylamino, N,N-diethylamino and the like, halogeno, e.g. fluoro, chloro, bromo and the like, trifluoromethyl or any other suitable substituent.

The substituents of the nitrogen atoms of the pyrazolo portion may also be carbocyclic aryl-aliphatic radicals, particularly monocyclic or bicyclic aryl-lower alkyl groups, such as phenyl-lower alkyl, e.g. benzyl, diphenylmethyl, 1-phenylethyl, 2-phenylethyl and the like, or naphthyl-lower alkyl, e.g. 1-naphthylmethyl, 2-naphthylmethyl, 2-(2-naphthyl)-ethyl and the like, and analogous radicals in which the phenyl and naphthyl portions are substituted by lower alkyl, lower alkoxy, lower alkyl-mercapto, nitro, amino, particularly N,N-di-lower alkyl-amino, halogeno, trifluoromethyl and the like, as exemplified hereinabove.

Heterocyclic aryl radicals may also substitute the nitrogen atoms of the pyrazolo ring and thus represent the groups $R_6$ and $R_7$ in the previously-given formula. Such radicals are, for example, monocyclic monoazacyclic aryl, such as pyrryl, pyridyl, e.g. 2-pyridyl, 3-pyridyl or 4-pyridyl, and the like, monocyclic diazacyclic aryl, e.g. 3-pyridazinyl, 2-pyrimidyl, 4-pyrimidyl, 2-pyrazinyl and the like, bicyclic monoazacyclic aryl, e.g. 4-quinolyl and the like, monocyclic mono-oxacyclic aryl, such as furyl, e.g. 2-furyl and the like, monocyclic monothiacyclic aryl, such as thienyl, e.g. 2-thienyl and the like, or any other suitable heterocyclic aryl radical. These groups may also contain substituents attached to the rings, such as, for example, lower alkyl containing from one to four carbon atoms, e.g. methyl, ethyl and the like, lower alkoxy containing from one to four carbon atoms, e.g. methoxy, ethoxy and the like, halogeno, e.g. fluoro, chloro, bromo and the like, or any other suitable substituents.

Substituents attached to the nitrogen atoms of the pyrazolo ring and represented by the groups $R_6$ and $R_7$ in the above formula may also be heterocyclic aryl-aliphatic radicals, such as, for example, monocyclic monoazacyclic aryl-lower alkyl, such as pyridyl-lower alkyl, e.g. 2-pyridylmethyl, 1-(2-pyridyl)-ethyl, 3-pyridylmethyl, 4-pyridylmethyl, 2-(2-pyridyl)-ethyl and the like, as well as pyrryl-lower alkyl, e.g. 2-pyrrylmethyl and the like, monocyclic diazacyclic aryl-lower alkyl, such as pyridazinyl-lower alkyl, pyrimidyl-lower alkyl, pyrazinyl-lower alkyl and the like, e.g. 3-pyridazinylmethyl, 2-pyrimidylmethyl, 4-pyrimidylmethyl, 2-(2-pyrazinyl)-ethyl and the like, bicyclic monoazacyclic aryl-lower alkyl, such as quinolyl-lower alkyl, e.g. 2-quinolylmethyl and the like, monocyclic mono-oxacyclic aryl-lower alkyl, such as furyl-lower alkyl, e.g. 2-furylmethyl and the like, monocyclic monothiacyclic aryl-lower alkyl, such as thienyl-lower alkyl, e.g. 2-thenyl and the like, as well as the above-given heterocyclic aryl-aliphatic radicals, in which the heterocyclic aryl radical contains substituents, such as lower alkyl, lower alkoxy, halogeno and the like, which groups have been exemplified hereinbefore.

The 13-position of the compounds is substituted, particularly by one of the groups $Y_1$ and $Y_2$ in the previously-shown formulae. These groups represent primarily hydroxyl and oxo, respectively, but may also stand for amino and imino, respectively, or etherified hydroxyl, particularly lower alkoxy, containing from one to four carbon atoms, e.g. methoxy, ethoxy and the like, as well as substituted amino, especially N-lower alkyl-amino, e.g. N-methylamino, N-ethylamino and the like, or N,N-di-lower alkyl-amino, e.g. N,N-dimethylamino, N,N-diethyl-amino and the like, or any other suitable etherified hydroxyl or substituted amino group.

Salts of the compounds of this invention are particularly therapeutically useful acid addition salts with inorganic acids, such as hydrochloric, hydrobromic, nitric, sulfuric, phosphoric acids and the like, as well as with organic acids, e.g. acteic, propionic, glycolic, lactic, pyruvic, oxalic, malonic, succinic, maleic, hydroxymaleic, dihydroxymaleic, fumaric, malic, tartaric, citric, benzoic, cinnamic, mandelic, salicylic, 4-aminosalicylic, 2-phenoxybenzoic, 2-acetoxybenzoic and the like, or with organic sulfonic acids, e.g. methane sulfonic, ethane sulfonic, 2-hydroxyethane sulfonic, benzene sulfonic, toluene sulfonic acid and the like. Salts which are primarily used for identification purposes are particularly those with acidic organic nitro compounds, e.g. picric, picrolonic or flavianic acid, or with metal complex acids, e.g. phosphotungstic, phosphomolybdic, chloroplatinic or Reinecke acid. Mono- or poly-salts may be formed according to the procedure used for the preparation of the salts and the number of salt-forming groups present in the molecule.

Also included within the scope of the present invention are the N-oxides of the above-mentioned compounds, as well as the therapeutically acceptable acid addition salts of these N-oxides, such as the addition salts with the above-mentioned inorganic, particularly mineral, and organic acids.

In view of the fact that several asymmetric carbon atoms are present in the compounds of this invention, the latter may be obtained in the form of a mixture of racemates, racemates or optically pure compounds.

The compounds of the present invention have antihypertensive properties and can be used as antihypertensive agents to relieve hypertensive conditions, such as, for example, benign or malignant hypertension, renal hypertension or hypertension associated with pregnancy, such as toxemia of pregnancy. They are practically free from any undesired side effects, such as sedative and tranquilizing properties.

Particularly useful as antihypertensive agents are the compounds of the formulae

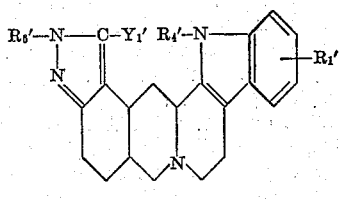

for

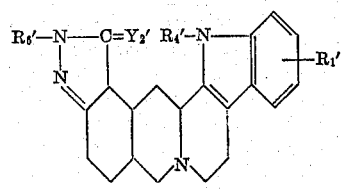

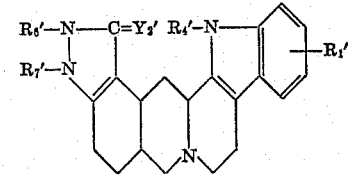

in which compounds the group $R_1'$ represents hydrogen, lower alkyl, containing from one to four carbon atoms, e.g. methyl, ethyl, isopropyl, tertiary butyl and the like, lower alkoxy, containing from one to four carbon atoms, e.g. methoxy, ethoxy, n-propyloxy, isopropyloxy, n-butyloxy and the like, or halogeno containing a molecular weight between 19 and 80, e.g. fluoro, chloro or bromo, whereby the lower alkyl or the lower alkoxy or the halogeno atom may be attached to any of the positions available for substitution, the group $R_4'$ represents primarily hydrogen, as well as lower alkyl, containing from one to four carbon atoms, e.g. methyl, ethyl, isopropyl and the like, each of the substituents $R_6'$ and $R_7'$ represent hydrogen, lower alkyl containing from one to four carbon atoms, e.g. methyl, ethyl, isopropyl and the like, hydroxy-lower alkyl, in which alkyl contains preferably from two to four carbon atoms, e.g. 2-hydroxy-ethyl and the like, cycloalkyl containing from five to six carbon atoms, e.g. cyclopentyl or cyclohexyl, phenyl, lower alkyl-phenyl, in which lower alkyl contains from one to four carbon atoms, e.g. 2-methylphenyl, 4-tertiary butyl-phenyl and the like, lower alkoxy-phenyl, in which alkoxy contains from one to four carbon atoms, e.g. 2-methoxy-phenyl, 4-ethoxy-phenyl, 3-isopropyloxy-phenyl and the like, lower alkylene-dioxy-phenyl, in which lower alkylene-dioxy contains from one to four carbon atoms, e.g. 3,4-methylenedioxy-phenyl and the like, halogeno-phenyl, in which halogeno has a molecular weight between 19 and 80, e.g. 3-fluorophenyl, 2,5-dichloro-phenyl, 4-bromo-phenyl and the like, trifluoromethyl-phenyl, e.g. 4-trifluoromethyl-phenyl and the like, phenyl-lower alkyl, in which lower alkyl contains from one to four carbon atoms, e.g. benzyl, 1-phenylethyl, 3-phenylpropyl, diphenylmethyl and the like, (lower alkyl-phenyl)-lower alkyl, in which lower alkyl contains from one to four carbon atoms, e.g. 3-methylbenzyl, 1-(4-tertiary butyl-phenyl)-ethyl and the like, (lower alkoxy-phenyl)-lower alkyl, in which lower alkoxy and lower alkyl contain from one to four carbon atoms, e.g. 3,4-dimethoxy-benzyl, 2-(4-ethoxy-phenyl)-ethyl and the like, (lower alkylene-dioxy-phenyl)-lower alkyl, in which lower alkylene-dioxy and lower alkyl contain from one to four carbon atoms, e.g. 3,4-methylenedioxybenzyl and the like, (halogeno-phenyl)-lower alkyl, in which halogeno has a molecular weight between 18 and 80, and lower alkyl contains from one to four carbon atoms, e.g. 3,4-dichloro-benzyl, 4-fluoro-benzyl, 1-(4-bromo-phenyl)-ethyl and the like, (trifluoromethyl-phenyl)-lower alkyl, in which lower alkyl contains from one to four carbon atoms, e.g. 4-trifluoromethyl-benzyl and the like, pyridyl, e.g. 2-pyridyl, 3-pyridyl, or 4-pyridyl, or pyridyl-lower alkyl, e.g. 2-pyridylmethyl, 2-(4-pyridyl)-ethyl and the like, $Y_1'$ represents hydrogen, lower alkoxy containing from one to four carbon atoms, e.g. methoxy, ethoxy, isopropyloxy and the like, or N,N-di-lower alkyl-amino, in which lower alkyl contains from one to four carbon atoms, e.g. N,N-dimethylamino, N,N-diethyl-amino and the like, and $Y_2'$ represents oxo or imino, and therapeutically acceptable acid addition salts thereof, particularly those with mineral acids, e.g. hydrochloric, hydrobromic, nitric, sulfuric, phosphoric acids and the like.

The compounds of this invention may be used as medicaments in the form of pharmaceutical preparations, which contain the new compounds or derivatives thereof, such as therapeutically acceptable acid addition salts, N-oxides or therapeutically acceptable acid addition salts of N-oxides thereof, in admixture with a pharmaceutical organic or inorganic, solid or liquid carrier suitable for enteral or parenteral administration. For making up the preparations there can be employed inert substances, which are compatible with the new compounds, such as water, gelatine, lactose, starches, stearic acid, magnesium stearate, stearyl alcohol, talc, vegetable oils, benzyl alcohols, gums, waxes, propylene glycol, polyalkylene glycols or any other known inert carrier used in medicaments. The pharmaceutical preparation may be in solid form, for example, as tablets, capsules, dragees and the like, or in liquid form, for example, as solutions, suspensions, emulsions and the like. If desired, they may contain additional substances, such as preserving, stabilizing, wetting, emulsifying agents and the like, salts for varying the osmotic pressure, buffers or any other auxiliary substances. They may also contain, in combination, other therapeutically useful substances.

The compounds of the present invention may be prepared, for example, by reacting a 12-functionally converted carboxyl-11-oxo-5,6,8,8a,9,10,11,12,12a,13,13a,14-dodecahydro-indolo[2,3 - b]benzo[h]quinolizine, particularly a compound of the formula

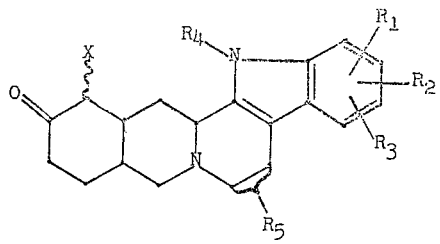

in which $R_1$, $R_2$, $R_3$, $R_4$ and $R_5$ have the previously-given meaning, and X represents a functionally converted carboxyl group, with a hydrazine, such as a hydrazine of the formula $R_6$—NH—NH—$R_7$, in which the groups $R_6$ and $R_7$ have the previously-given meaning, and, if desired, replacing hydrogen atoms present in the pyrazolo portion or the pyrrolo portion of the resulting compound by substituents, and/or, if desired, converting a resulting compound into a salt, an N-oxide or into a salt of an N-oxide thereof.

The functionally converted carboxyl group, such as the group X in the previously-shown formula, is represented primarily by a carbo-lower alkoxy group, e.g. carbomethoxy, carbethoxy and the like, as well as by a carbamyl group, e.g. carbamyl or N-substituted carbamyl, or cyano.

The reaction of the starting material with the hydrazine compound, which may also be employed in its hydrated form, is carried out in the presence of an inert solvent, such as a lower alkanol, e.g. methanol, ethanol and the like, or any other suitable solvent, if necessary, while cooling or at an elevated temperature, under increased pressure, and/or in the atmosphere of an inert gas, e.g. nitrogen.

The resulting product is isolated and purified according to known methods, such as extraction, adsorption and elution, crystallization, recrystallization and the like.

Hydrogen atoms present in the pyrazolo or pyrrolo portions of the resulting compounds may be replaced by substituents, such as those previously mentioned. Replacement may be carried out according to known methods, for example, by forming a salt, particularly an alkali metal, e.g. lithium, sodium or potassium, salt and reacting such salt with a reactive ester of an alcohol with a strong inorganic or organic acid. A metal salt may be formed, for example, by treating the resulting compound with an alkali metal hydride, amide or lower alkoxide, e.g. lithium hydride, sodium hydride, sodium amide, sodium methoxide, sodium ethoxide, potassium tertiary butoxide and the like, in an inert solvent. Reactive esters of alcohols with strong inorganic, e.g. hydrochloric, hydrobromic, hydriodic, sulfuric and the like, acids, or strong organic, particularly sulfonic, e.g. methane sulfonic, 2-hydroxy-ethane sulfonic, p-toluene sulfonic and the like, acids are particularly esters of alcohols of the formulae $R_6$—OH or $R_7$—OH, in which $R_6$ and $R_7$ stand for substituents having the previously-given meaning. According to the above procedure a free hydroxyl group in the 13-position may be converted into an etherified hydroxyl group, and/or the hydrogen atoms attached to nitrogens of the pyrazolo and/or the pyrrolo portions may be replaced by a substituent.

The starting materials used in the above procedure are known or may be prepared according to known methods, for example, by oxidating a hydroxyl group attached to the 11-position of a 12α-carbo-lower alkoxy-5,6,8,8a,9,10,11,12,12a,13,13a,14-dodecahydroindolo[2,3 - b]benzo[h]quinolizine, using an Oppenauer-type oxidation procedure, for example, treatment with a metal alkoxide, e.g. aluminum isopropoxide, potassium tertiary butoxide and the like, in the presence of a hydrogen acceptor, particularly a ketone, e.g. acetone, cyclohexanone, fluorenone and the like. In a resulting starting material a carbo-lower alkoxy, such as a carbomethoxy and the like, group may be converted into a carbamyl group (by amidation) or into a free carboxyl group (by hydrolysis); the ammonium salt of the latter or a carbamyl group may be dehydrated to the desired cyano group, for example, by treatment with phosphorus pentoxide and the like.

Compounds of the present invention which contain more than one asymmetric atom, may be obtained in the form of mixtures of racemates. Such mixtures of racemates may be separated into individual racemic compounds, salts or the quaternary ammonium compounds thereof, using known methods, which may be, for example, based on physico-chemical defferences, such as solubility, adsorbability and the like. Thus, mixtures of racemates may be separated by fractionate crystallization, if necessary, by using a derivative, e.g. a salt or a quaternary ammonium compound, of a mixture of racemates, by fractionated distillation and the like.

Separated racemates or resulting racemates of compounds which contain one asymmetric carbon atom only, may be resolved into the optically active forms, the levo-rotatory l-form and the dextro-rotatory d-form. Resolution procedures may be carried out according to known methods suitable for the separation of racemates. For example, to a solution of the free base of a racemate (a d,l-compound) in a solvent, such as a lower alkanol, e.g. methanol, ethanol, isopropanol and the like, a lower alkanone, e.g. acetone, ethyl methyl ketone and the like, or a mixture of such solvents or any other suitable solvent, is added one of the optically active forms of an acid containing an asymmetric carbon atom, or a solution thereof, for example, in the same lower alkanol, lower alkanone or solvent mixture mentioned hereinabove. Salts, which are formed by the optically active forms of the base with the optically active form of the acid may then be isolated, primarily on the basis of their different solubilities. Especially useful as optically active forms of salt-forming acids having an asymmetric carbon atom are the d-tartaric acid (L-tartaric acid) and the l-tartaric acid (D-tartaric acid); the optically active forms of dibenzoyl tartaric, di-p-toluyl-tartaric, malic, mandelic, 10-camphor sulfonic acid, quinic acid and the like, may also be used. The free and optically active base may be obtained from a resulting salt according to methods known for the conversion of a salt into a base, for example, as is outlined hereinbelow. An optically active base may be converted into a therapeutically useful acid addition salt with one of the acids mentioned hereinbefore, or may be converted into a quaternary ammonium compound as will be described hereinbelow. The optically active forms may also be isolated by biochemical methods.

The compounds of this invention may be obtained in the form of the free bases or as the salts thereof. A salt may be converted into the free base, for example, by reaction with an alkaline reagent, such as aqueous alkali metal hydroxide, e.g. lithium hydroxide, sodium hydroxide, potassium hydroxide and the like, aqueous alkali metal carbonate, e.g. sodium or potassium carbonate or hydrogen carbonate and the like, ammonia, such as aqueous ammonia, ammonia in a lower alkanol, e.g. methanol, ethanol and the like, an ion exchange resin or any other suitable reagent. A free base may be converted into its therapeutically useful acid addition salts by reacting the former with one of the organic acids mentioned hereinbefore. The salt-forming reaction may be carried out, for example, by treating a solution of the free base in a solvent, such as a lower alkanol, e.g. methanol, ethanol, n-propanol and the like, an ether, e.g. diethyl ether, diisopropyl ether and the like, a lower alkyl lower alkanolate, e.g. methyl acetate, ethyl acetate and the like, a lower alkanone, e.g. acetone, ethyl methyl ketone and the like, an aliphatic hydrocarbon, e.g. pentane, hexane and the like, a halogenated aliphatic hydrocarbon, e.g. methylene chloride, ethylene chloride and the like, a monocyclic carbocyclic aryl hydrocarbon, e.g. benzene, toluene, xylene and the like, or any other suitable solvent or solvent mixture, with the acid or a solution thereof and isolating the desired salt. Salt formation may also be accomplished by treatment with a suitable ion exchange resin. The salts may be obtained as the hemihydrates, monohydrates, sesquihydrates or polyhydrates, depending on the conditions used in the formation of the salts. Mono- or poly-salts may be formed according to the conditions used in the procedure for the preparation of the salts and/or the number of salt-forming groups present.

The invention also comprises any modification of the process wherein a compound obtainable as an intermediate at any stage of the process is used as starting material and the remaining step(s) of the process is(are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

A mixture of 4.0 g. of 12α-carbomethoxy-11-oxo-5,6,8,8aβ,9,10,11,12,12aα,13,13aα,14 - dodecahydro - indolo [2,3-b]benzo[h]quinolizine (or yohimbinone) and 4.5 ml. of hydrazine in 1600 ml. of methanol is refluxed for 8½ hours under an atmosphere of nitrogen. After standing for 2½ days at room temperature, the solvent is evaporated under reduced pressure and the residue is heated on the steam bath and under reduced pressure for an additional 3½ hours. The residue is dissolved in 400 ml. of methanol, and 8 ml. of a 1:1-mixture of concentrated nitric acid and water is added. On cooling and scratching the dinitrate of 13-hydroxy-5,6,8,8aβ,9,10,13bα,14,14aα,15 - decahydro - 12H - indolo [2,3-b]indazolo[5,4-h]quinolizine of the formula

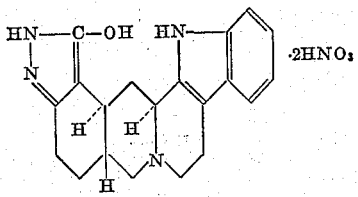

crystallizes, M.P. 287–289° (taken under reduced pressure); yield: 3.42 g. *Microanalysis.*—Calculated for $C_{20}H_{22}N_4O \cdot 2HNO_3$: C, 52.17; H, 5.26; N, 18.25. Found: C, 52.23; H, 5.44; N, 18.23. $[\alpha]_D$ —36° (in N,N-dimethylformamide). Ultraviolet absorption in ethanol: $\lambda_{max.}$ at 257 mμ ($\epsilon$=10,500) and 289 mμ ($\epsilon$=6,300); $\lambda_{shoulder}$ at 221 mμ ($\epsilon$=53,000), 272 mμ ($\epsilon$=9,100) and 281 mμ ($\epsilon$=8,000); $\lambda_{min.}$ at 238 mμ ($\epsilon$=7,100) and 286 mμ ($\epsilon$=5,600). Ultraviolet absorption spectrum in ethanol containing potassium hydroxide: $\lambda_{max.}$ at 225 mμ ($\epsilon$=42,000) and 279–281 mμ ($\epsilon$=8,600); $\lambda_{shoulder}$ at 248 mμ ($\epsilon$=10,000) and 272 mμ ($\epsilon$=8,300); $\lambda_{plateau}$ at 288–289 mμ ($\epsilon$=7,200); $\lambda_{min.}$ at 261–263 mμ ($\epsilon$=7,500). Infrared absorption spectrum in Nujol: 3230 cm.$^{-1}$ (medium); 1622 cm.$^{-1}$ (weak), 1591 cm.$^{-1}$ (medium), 1300 cm.$^{-1}$ (strong), 1281 cm.$^{-1}$ (strong), 1035 cm.$^{-1}$ (medium), 763 cm.$^{-1}$ (medium) and 749 cm.$^{-1}$ (medium).

The starting material used in the above procedure is prepared as follows: to 2.9 g. of potassium tertiary butoxide (prepared by reaction of dry tertiary butanol and potassium and sublimation at 290–330°/0.1 mm.) are added 3.65 g. of fluorenone (dried over phosphorus pentoxide under reduced pressure) and 2.0 g. of 12α-carbomethoxy - 11-oxo-5,6,8,8aβ,9,10,11,12,12aα,13,13aα, 14 - dodecahydro - indolo[2,3 - b]benzo[h]quinolizine (yohimbine, dried for about one hour at 120–125° under reduced pressure) while excluding moisture. 50 ml. of benzene (dried with aluminum oxide, Activity I) is given to the mixture, nitrogen is passed through the reaction vessel, and the reaction is carried out while gently refluxing for about one hour, whereupon the solution turns dark. It is allowed to stand at 4° for twelve hours, 25 ml. of water and 25 ml. of ethyl acetate is added, the organic phase is separated and the aqueous layer is extracted three times with 50 ml. portions of ethyl acetate by gently swirling the solvent to avoid the formation of emulsions. The combined organic extract is washed twice with 50 ml. of water and then extracted once with a 200 ml. portion and twice with 100 ml. portions of 5 percent aqueous acetic acid. The acidic extract is washed with 100 ml. of diethyl ether, made basic with 20 percent aqueous sodium carbonate and extracted with one portion of 200 ml. and two portions of 150 ml. of water, dried over sodium sulfate and evaporated to a volume of about 20 ml. The resulting precipitate is removed by filtration to give 0.787 g. of 12α-carbomethoxy-11-oxo-5,6,8,8aα, 9,10,11,12,12aα,13,13aα,14 - dodecahydro - indolo[2,3-b] benzo[h]quinolizine (or yohimbinone) of the formula

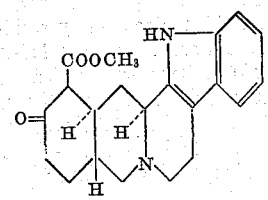

which metls at 261° (under reduced pressure); $[\alpha]_D^{26}$ +22.1 to +23.1 (in pyridine); ultraviolet absorption spectrum in ethanol: $\lambda_{max.}$ at 224–225 mμ ($\epsilon$=39,100), 282–283 mμ ($\epsilon$=8,100) and 289–290 mμ ($\epsilon$=6,700); infrared absorption spectrum in Nujol: strong peaks at 1740 cm.$^{-1}$, 1708 cm.$^{-1}$, 1150 cm.$^{-1}$, 1141 cm.$^{-1}$, 751 cm.$^{-1}$ and 746 cm.$^{-1}$.

*Example 2*

A mixture of 1.0 g. of 12α-carbomethoxy-11-oxo-5,6, 8,8aα,9,10,11,12,12aα,13,13aα,14 - dodecahydro - indolo [2,3-b]benzo[h]quinolizine (or yohimbinone) and 5.0 g. of phenylhydrazine in 250 ml. of methanol is refluxed under a nitrogen atmosphere for thirty hours. The reaction mixture is allowed to stand overnight at room tempertaure, the solvent is evaporated under reduced pressure to a total volume of about 50 ml., the concentrated solution is cooled and the crystalline mass is filtered off. The resulting 13-oxo-12-phenyl-5,6,8,8aα,9,10,13, 13a,13bα,14,14aα,15 - dodecahydro-indolo[2,3-b]indazolo [5,4-h]quinolizine of the formula

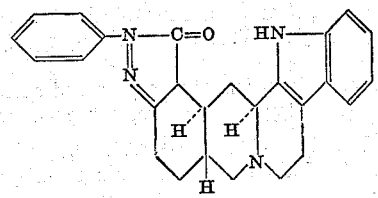

which may also be present in its tautomeric form, the 13-oxo - 12 - phenyl - 5,6,8,8aα,9,10,11,13,13bα,14,14aα,15- dodecahydro - 12H - indolo[2,3-b]indazolo[5,4-h]quinolizine of the formula

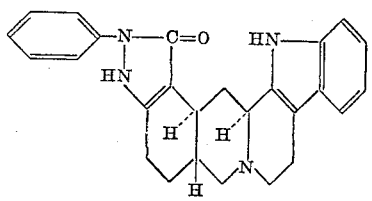

is recrystallized from a mixture of methanol and methylene chloride, M.P. 308–310°; yield: 0.615 g. *Microanalysis.*—Calculated for $C_{20}H_{26}N_4O$: C, 76.07; H, 6.38. Found: C, 76.12; H, 6.37. Ultraviolet absorption spectrum in ethanol: $\lambda_{max.}$ at 225–226 m$\mu$ ($\epsilon=44,000$), 249 m$\mu$ ($\epsilon=15,800$) and 273–280 m$\mu$ ($\epsilon=17,500$); $\lambda_{shoulder}$ at 289 m$\mu$ ($\epsilon=14,000$); $\lambda_{min.}$ at 241 m$\mu$ ($\epsilon=15,000$) and 259 m$\mu$ ($\epsilon=15,000$). Infrared absorption spectrum in Nujol: 3470 cm.$^{-1}$ (medium), 3180 cm.$^{-1}$ (strong), 1706 cm.$^{-1}$ (strong), 1621 cm.$^{-1}$ (weak), 1599 cm.$^{-1}$ (medium), 1500 cm.$^{-1}$ (strong), 1320 cm.$^{-1}$ (strong), 1300 cm.$^{-1}$ (strong), 742 cm.$^{1-}$ (strong) and 688 cm.$^{-1}$ (medium).

*Example 3*

A mixture of 2.0 g. of 12$\alpha$-carbomethoxy-11-oxo-5,6,8,8a$\alpha$,9,10,11,12,12a$\alpha$,13,13a$\alpha$,14 - dodecahydro - indolo [2,3-b]benzo[h]quinolizine (or yohimbinone) and 2.3 g. of 2-hyroxy-ethylhydrazine in 500 ml. of methanol is refluxed in a nitrogen atmosphere for 22 hours. After cooling the methanol is evaporated under reduced pressure while allowing a small amount of nitrogen to pass through the reaction vessel. The black, tarry residue is dissolved in 20 ml. of methanol and 1.1 ml. of a 1:1-mixture of concentrated nitric acid and water is added. After standing at room temperature for three days, the crystalline dinitrate of 12-(2-hydroxyethyl)-13-hydroxy-5,6,8,8a$\alpha$,9,10,13b$\alpha$,14,14a$\alpha$,15 - decahydro - 12H - indolo[2,3-b]indazolo[5,4-h]quinolizine of the formula:

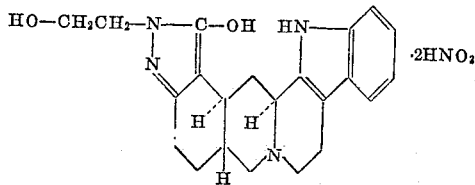

is filtered off, M.P. 254–255° (taken under reduced pressure); yield: 1.18 g. *Microanalysis.*—Calculated for $C_{22}H_{26}N_4O_2 \cdot 2HNO_3$: C, 52.37; H, 5.59; N, 16.66. Found: C, 52.51; H, 5.80; N, 16.83. Ultraviolet absorption spectrum in ethanol: $\lambda_{max.}$ at 217–218 m$\mu$ ($\epsilon=50,000$), 256–258 m$\mu$ ($\epsilon=13,700$) and 289 m$\mu$ ($\epsilon=6,600$); $\lambda_{shoulder}$ at 271 m$\mu$ ($\epsilon=10,800$) and 281 m$\mu$ ($\epsilon=8,500$); $\lambda_{min.}$ at 235–238 m$\mu$ ($\epsilon=8,400$) and 286 m$\mu$ ($\epsilon=5,900$). Infrared absorption spectrum in Nujol: 3170 cm.$^{-1}$ (medium), 1621 cm.$^{-1}$ (weak), 1590 cm.$^{-1}$ (weak), 1538 cm.$^{-1}$ (weak), 1282 cm.$^{-1}$ (strong), 1030 cm.$^{-1}$ (medium) and 742 cm.$^{-1}$ (medium). The compound forms a mononitrate monohydrate, M.P. 235–237° (taken under reduced pressure); $[\alpha]_D^{25}$ +6.1 (in N,N-dimethylformamide); infrared absorption spectrum in Nujol: 3160 cm.$^{-1}$ (strong), 1580 cm.$^{-1}$ (strong), 1355 cm.$^{-1}$ (strong), 1320 cm.$^{-1}$ (strong), 1062 cm.$^{-1}$ (medium) and 744 cm.$^{-1}$ (medium).

Other compounds which can be prepared according to the above described procedure are, for example, 13-hydroxy-2-methoxy-5,6,8,8a$\alpha$,9,10,13b$\alpha$,14,14a$\beta$,15-decahydro-12H-indolo[2,3-b]indazolo[5,4-h]quinolizine, 13-hydroxy-2-methoxy-12-(4-pyridyl)-5,6,8,8a$\alpha$,9,10,13b$\alpha$,14,14a$\beta$,15-decahydro-12H-indolo[2,3-b]indazolo[5,4-h]quinolizine, 12-cyclohexyl-13-hydroxy-5,6,8,8a$\alpha$,9,10,13b$\alpha$,14,14a$\beta$,15-decahydro-12H-indolo[2,3-b]indazolo[5,4-h]quinolizine, 11,12-dimethyl-13-oxo-5,6,8,8a$\beta$,9,10,11,13,13b$\alpha$,14,14a$\alpha$,15-dodecahydro-12H-indolo[2,3-b]indazolo[5,4-h]quinolizine, 12-(4-chloro-phenyl)-13-hydroxy-5,6,8,8a$\beta$,9,10,13b$\alpha$,14,14a$\alpha$,15-decahydro-12H-indolo[2,3-b]indazolo[5,4-h]quinolizine, 12-benzyl-12-hydroxy-5,6,8,8a$\beta$,9,10,13b$\alpha$,14,14a$\alpha$,15-decahydro-12H-indolo[2,3-b]indazolo[5,4-h]quinolizine, 13-hydroxy-12-(2-thenyl)-5,6,8,8a$\beta$,9,10,13b$\alpha$,14,14a$\alpha$,15-decahydro-12H-indolo[2,3-b]indazolo[5,4-h]quinolizine, 13-hydroxy-12-isobutyl-5,6,8,8a$\beta$,9,10,13b$\alpha$,14,14a$\alpha$,15-decahydro-12H-indolo[2,3-b]indazolo[5,4-h]quinolizine, 13-hydroxy-12-isopropyl-5,6,8,8a$\beta$,9,10,13b$\alpha$,14,14a$\alpha$,15-decahydro-12H-indolo[2,3-b]indazolo[5,4-h]quinolizine, 12-(2-N,N-dimethylaminoethyl)-13-hydroxy-5,6,8,8a$\beta$,9,10,13b$\alpha$,14,14a$\alpha$,15-decahydro-12H-indolo[2,3-b]indazolo[5,4-h]quinolizine, 13-hydroxy-12-[2-(1-piperidino)-ethyl]-5,6,8,8a$\beta$,9,10,13b$\alpha$,14,14a$\alpha$,15-decahydro-12H-indolo[2,3-b]indazolo[5,4-h]quinolizine, and the like, which compounds are preferably characterized as the acid addition salts.

What is claimed is:

1. A member selected from the group consisting of compound having a formula selected from the group consisting of

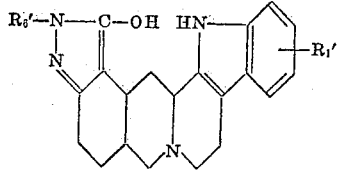

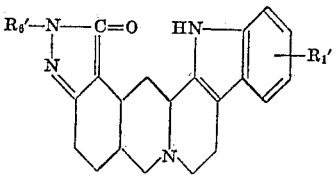

and

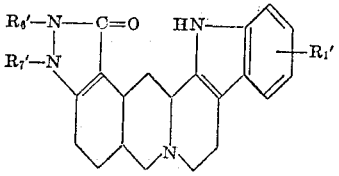

in which $R_1'$ is a member selected from the group consisting of hydrogen and lower alkoxy, the group $R_6'$ is a member selected from the group consisting of hydrogen, lower alkyl, hydroxy-lower alkyl, N,N-di-lower alkylamino-lower alkyl, N,N-alkylene-imino-lower alkyl, in which alkylene has from four to seven carbon atoms, cycloalkyl having from three to eight ring carbon atoms, phenyl, halogeno-phenyl, phenyl-lower alkyl, pyridyl and thenyl, and $R_7'$ is a member selected from the group consisting of hydrogen and lower alkyl, a pharmaceutically acceptable acid addition salt thereof, an N-oxide thereof and a pharmaceutically acceptable acid addition salt of an N-oxide thereof.

2. 13 - hydroxy - 5,6,8,8a$\beta$,9,10,13b$\alpha$,14,14a$\alpha$,15 - decahydro-12H-indolo[2,3-b]indazolo[5,4-h]quinolizine.

3. 13 - oxo - 12 - phenyl - 5,6,8,8aα,9,10,13,13a,13bα,14,14aα,15 - dodecahydro - 12H - indolo[2,3 - b]indazolo[5,4-h]quinolizine.

4. 13 - oxo - 12 - phenyl - 5,6,8,8aα,9,10,13,13bα,14,14aα,15 - dodecahydro - 12H - indolo[2,3 - b]indazolo[5,4-h]quinolizine.

5. 12 - (2 - hydroxy - ethyl) - 13 - hydroxy - 5,6,8,8aα,9,10,13bα,14,14aα,15 - decahydro - 12H - indolo[2,3 - b]indazolo[5,4-h]quinolizine.

No references cited.